(12) United States Patent
Mudry et al.

(10) Patent No.: US 11,746,976 B2
(45) Date of Patent: Sep. 5, 2023

(54) AUTOMOTIVE LIGHTING DEVICE

(71) Applicant: VALEO VISION, Bobigny (FR)

(72) Inventors: Emeric Mudry, Bobigny (FR);
Corneliu Borzan, Bobigny (FR);
Geoffrey Creus, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 17/786,682

(22) PCT Filed: Dec. 21, 2020

(86) PCT No.: PCT/EP2020/087543
§ 371 (c)(1),
(2) Date: Jun. 17, 2022

(87) PCT Pub. No.: WO2021/123454
PCT Pub. Date: Jun. 24, 2021

(65) Prior Publication Data
US 2022/0333753 A1    Oct. 20, 2022

(30) Foreign Application Priority Data
Dec. 20, 2019  (FR) ...................................... 1915169

(51) Int. Cl.
*F21S 41/19* (2018.01)
*F21S 41/147* (2018.01)
(Continued)

(52) U.S. Cl.
CPC .......... *F21S 41/198* (2018.01); *B60Q 1/2669* (2013.01); *F21S 41/147* (2018.01);
(Continued)

(58) Field of Classification Search
CPC .............. B60Q 2400/40; B60Q 1/2669; G02B 3/0037; G02B 3/0043; G02B 3/005;
(Continued)

(56) References Cited

U.S. PATENT DOCUMENTS 10,962,191 B1 *  3/2021  Go ........................ F21S 41/255
2018/0170244 A1 *  6/2018  Chen ...................... G02B 27/34
(Continued)

FOREIGN PATENT DOCUMENTS

CN         103363418 B    1/2016
DE      102018107214 A1   10/2019
(Continued)

OTHER PUBLICATIONS

European Patent Office, International Search Report and Written Opinion of corresponding International Application No. PCT/EP2020/087543, dated Mar. 12, 2021.

*Primary Examiner* — Colin J Cattanach
(74) *Attorney, Agent, or Firm* — Valeo Vision

(57) ABSTRACT

The invention provides an automotive lighting device with a circuit support, an optics support, a holder support and a microlenses support. The optics support includes optical elements, each one being arranged in front of one of the solid-state light sources of the printed circuit board. The optics support further includes positioning protrusions configured to fit the positioning housings of the circuit support. The holder support includes a plurality of opaque walls, a first coupler and a second coupler. Each opaque wall is located between two optical elements. The microlenses support includes a plurality of groups of microlenses, each group having a plurality of microlenses arranged to receive the light projected by one optical elements. The first coupler is configured to couple the holder support to the circuit support. The second coupler is intended to retain the microlenses support.

6 Claims, 3 Drawing Sheets

(51) Int. Cl.
*F21S 43/27* (2018.01)
*B60Q 1/26* (2006.01)
*F21W 102/40* (2018.01)
*F21W 104/00* (2018.01)
*G02B 3/00* (2006.01)
*F21V 19/00* (2006.01)
*G02B 6/12* (2006.01)
*G02B 5/00* (2006.01)
*F21V 5/00* (2018.01)
*F21V 17/16* (2006.01)
*G02B 19/00* (2006.01)

(52) U.S. Cl.
CPC .......... *F21S 43/27* (2018.01); *B60Q 2400/40* (2013.01); *B60Q 2400/50* (2013.01); *F21V 5/002* (2013.01); *F21V 5/004* (2013.01); *F21V 5/007* (2013.01); *F21V 5/008* (2013.01); *F21V 17/16* (2013.01); *F21V 17/164* (2013.01); *F21V 19/004* (2013.01); *F21V 19/0035* (2013.01); *F21W 2102/40* (2018.01); *F21W 2104/00* (2018.01); *G02B 3/005* (2013.01); *G02B 3/0037* (2013.01); *G02B 3/0043* (2013.01); *G02B 3/0056* (2013.01); *G02B 3/0062* (2013.01); *G02B 3/0068* (2013.01); *G02B 3/0075* (2013.01); *G02B 5/003* (2013.01); *G02B 19/0066* (2013.01); *G02B 2006/12126* (2013.01)

(58) Field of Classification Search
CPC .. G02B 3/0056; G02B 3/0062; G02B 3/0068; G02B 3/0075; G02B 2006/12126; G02B 5/003; G02B 19/0066; F21V 19/0035; F21V 19/004; F21V 5/002; F21V 5/004; F21V 5/007; F21V 5/008; F21V 17/16; F21V 17/164; F21S 41/198
See application file for complete search history.

(56) References Cited

U.S. PATENT DOCUMENTS

| 2019/0068845 | A1* | 2/2019 | Krishnan | B60Q 1/2661 |
| 2019/0270403 | A1* | 9/2019 | Sobecki | F21S 43/51 |
| 2019/0301699 | A1 | 10/2019 | Fischer | |
| 2019/0322209 | A1 | 10/2019 | Sugiyama et al. | |

FOREIGN PATENT DOCUMENTS

| EP | 3299698 A1 | 3/2018 |
| WO | 2014045147 A1 | 3/2014 |
| WO | 2018193000 A1 | 10/2018 |

* cited by examiner

AUTOMOTIVE LIGHTING DEVICE

CROSS-REFERENCE TO RELATED APPLICATIONS

This application is filed under 35 U.S.C. § 371 U.S. National Phase of International Application No. PCT/EP2020/087543 filed Dec. 21, 2020 (published as WO2021123454), which claims priority benefit to French application No. 1915169 filed on Dec. 20, 2019, the disclosures of which are herein incorporated by reference in their entirety.

TECHNICAL FIELD

This invention is related to the field of lighting devices which are intended to provide auxiliary functions such as welcome light.

BACKGROUND OF THE INVENTION

Current automotive vehicles provide different lighting functionalities. Further than traditional lighting and signalling, some lighting devices are intended to provide light patterns in the area surrounding the car body.

Sometimes, these devices are integrated in the door handle, mirrors or rocker panel, to produce a welcome effect or illuminate a dark environment when the user approaches the car.

However, current devices are only configured to provide a static light pattern, which is sometimes limited. Further configurations are required by car manufacturers and none of the existing devices are able to provide them.

BRIEF SUMMARY OF THE INVENTION

The invention provides a solution for these problems by means of an automotive lighting device comprising
a circuit support comprising a plurality of solid-state light sources, a plurality of positioning housings and a lateral surface;
an optics support comprising a plurality of optical elements, each optical element being arranged in front of one of the solid-state light sources, the optics support further comprising positioning protrusions configured to fit the positioning housings of the circuit support;
a holder support comprising a plurality of opaque walls, a first coupler and a second coupler, the holder support being arranged so that each opaque wall is located between two optical elements and the holder support being arranged so that at least a portion of the optics support is located between the holder support and the circuit support;
a microlenses support, comprising a plurality of groups of microlenses, each group of microlenses comprising a plurality of microlenses arranged to receive the light projected by one optical element;
wherein the first coupler is configured to couple the holder support to the circuit support; and
wherein the second coupler is intended to retain the microlenses support.

This lighting device is able to provide a dynamic light pattern, due to the independent microlenses groups, which may combine to form portions of dynamic patterns without being affected by the projection of the neighboring array. The term "microlens" refers to small lens, here with a diameter less than a millimeter (mm), preferably less than 400 micrometers, more preferably as small as 10 micrometres (µm). Micro-lens arrays or groups contain multiple lenses formed in a two-dimensional array on a supporting substrate.

The term "solid state" refers to light emitted by solid-state electroluminescence, which uses semiconductors to convert electricity into light. Compared to incandescent lighting, solid state lighting creates visible light with reduced heat generation and less energy dissipation. The typically small mass of a solid-state electronic lighting device provides for greater resistance to shock and vibration compared to brittle glass tubes/bulbs and long, thin filament wires. They also eliminate filament evaporation, potentially increasing the life span of the illumination device. Some examples of these types of lighting comprise semiconductor light-emitting diodes (LEDs), organic light-emitting diodes (OLED), or polymer light-emitting diodes (PLED) as sources of illumination rather than electrical filaments, plasma or gas.

The positioning of each element is advantageously provided by a system of couplers and positioning elements, which makes manufacturing easier and ensures the correct positioning between each optical element.

In some particular embodiments, the circuit support comprises at least four solid-state light sources, the optics support comprises at least four optical elements and the microlenses support comprises at least four groups or array of microlenses.

A device with four sub-modules is enough to provide complex dynamic patterns around the car body.

In some particular embodiments, the first coupler is arranged to pass around the optics support and be coupled to the lateral surface of the circuit support.

This way of arranging the coupling between the optics support and the circuit support ensures the correct positioning of the optics support, which is trapped between the holder support and the circuit support. Since the optics support comprises the positioning means, which ensures the correct position of the optics support with respect to the circuit support, i.e. with the solid-state light sources, this coupling completes the positioning of the optical elements with respect to the rest of the elements of the device.

In some particular embodiments, the first coupler is arranged to be coupled to the lateral surface of the circuit support by snap-fit.

Snap-fit is an advantageous way of obtaining an accurate and reliable connection and ensuring the correct positioning of the involved elements.

In some particular embodiments, the optical elements comprise collimators.

Collimators are the best option to provide a directed light pattern, that may reach the microlenses array.

In some particular embodiments, the lighting device further comprises a housing support and a housing cover with an outer lens, so that the circuit support is attached to the housing support and the outer lens is arranged to receive the light projected by the microlenses.

This arrangement may be coupled to a door handle or to a mirror or a rocker panel.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

In this text, the term "comprises" and its derivations (such as "comprising", etc.) should not be understood in an excluding sense, that is, these terms should not be interpreted as excluding the possibility that what is described and defined may include further elements, steps, etc.

BRIEF DESCRIPTION OF THE DRAWINGS

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures.

DETAILED DESCRIPTION OF THE INVENTION

Figure 1:
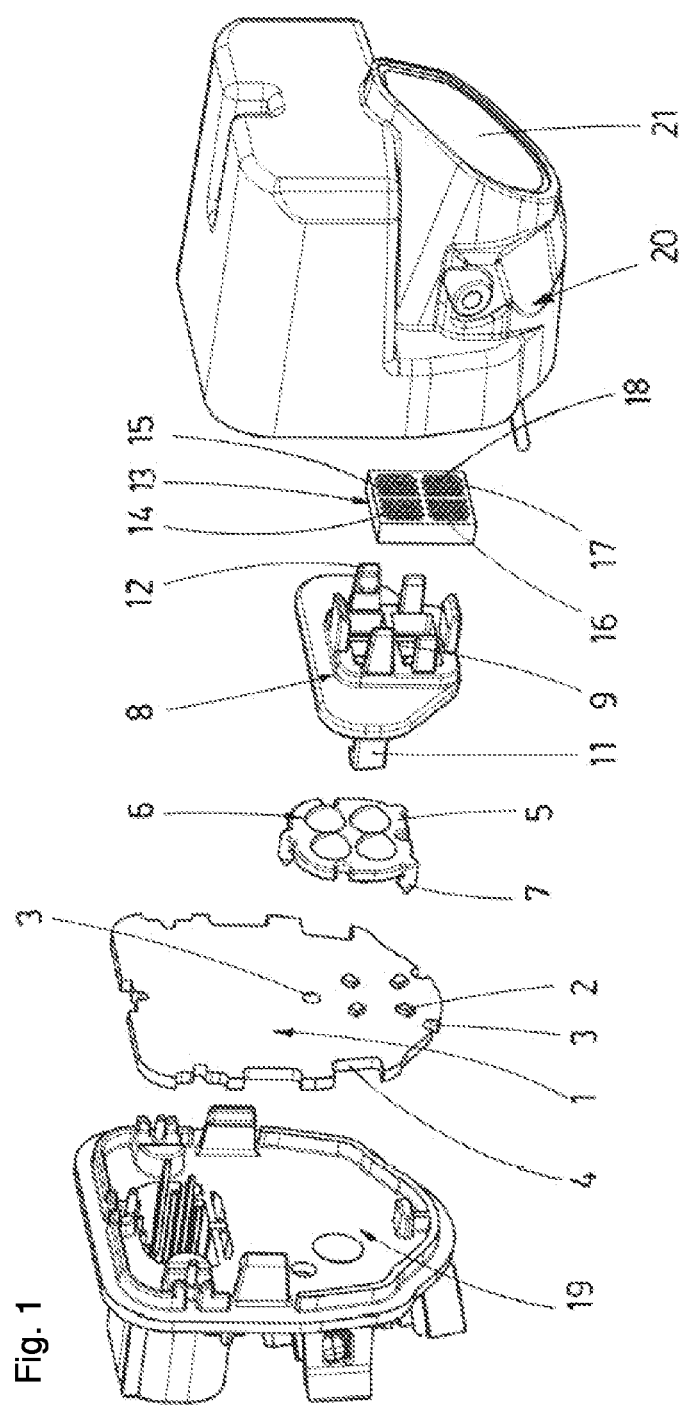
FIG. 1 shows an exploded view of some elements of a lighting device according to the invention.

The example embodiments are described in sufficient detail to enable those of ordinary skill in the art to embody and implement the systems and processes herein described. It is important to understand that embodiments can be provided in many alternate forms and should not be construed as limited to the examples set forth herein.

Accordingly, while embodiment can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included.

The example embodiments are described in sufficient detail to enable those of ordinary skill in the art to embody and implement the systems and processes herein described. It is important to understand that embodiments can be provided in many alternate forms and should not be construed as limited to the examples set forth herein.

Accordingly, while embodiment can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

FIG. 1 shows an exploded view of some elements of a lighting device according to the invention.

A first element that may be seen in this figure is a printed circuit board 1 comprising a lateral surface 4. This printed circuit board 1 comprises four LEDs 2 as a part of the electric circuit. Further from the electric arrangement, this printed circuit board further comprises some positioning housings 3.

A second element that may be seen in this figure is an optics support 5 comprising four collimators 6, each collimator 6 being intended to be arranged in front of one of the LEDs 2.

To perform the positioning of the optics support 5 with respect to the printed circuit board, the optics support 5 further comprises positioning protrusions 7 configured to fit the positioning housings 3 of the printed circuit board 1.

A third element that may be seen in this figure is a holder support 8 comprising a plurality of opaque walls 9. When the elements are assembled, each opaque wall 9 is arranged between two collimators 6, to avoid that the light projected by one of the collimators mixes with the light projected by the neighboring one.

To perform physical connections between the elements, the holder support 8 comprises a first coupler 11 and a second coupler 12. The first coupler 11 and the second coupler 12 are respectively protruding from opposite faces of the holder 8.

The first coupler 11 is a coupling leg ending in a snap-fit connection. This coupling leg passes around the optics support 5 and is intended to reach the lateral surface 4 of the circuit support 1 and be coupled to it by a snap-fit attachment.

As a consequence, the optics support 5 is trapped between the holder element 8 and the printed circuit board 5, thus achieving the coupling of these three elements as a single module.

A fourth element that may be seen in this figure is a microlenses support 13, which comprises four groups or arrays of microlenses 14, 15, 16, 17. The four arrays are arranged in a two rows and two columns matrix. Each group or array of microlenses comprises a plurality of microlenses 18 arranged to receive the light projected by one of the collimators 6.

The microlenses support 13 has a parallelepiped shape, so that the second coupler 12, which is also a leg ending in a snap-fit connection, is configured to retain the microlenses support 13 by means of a snap-fit attachment.

The holder 8 is therefore connected on one side, oriented towards the LEDs 2, to the optics support 5 and on the opposite side to the microlenses support 13. This central position of the holder 8 allows an assembly with a few numbers of parts.

Further elements that may be seen in this figure are a housing support 19 and a housing cover 20 with an outer lens 21. The circuit board 1 is attached to the housing support 19 and the outer lens 21 is arranged to receive the light projected by the microlenses 18.

Figure 2:
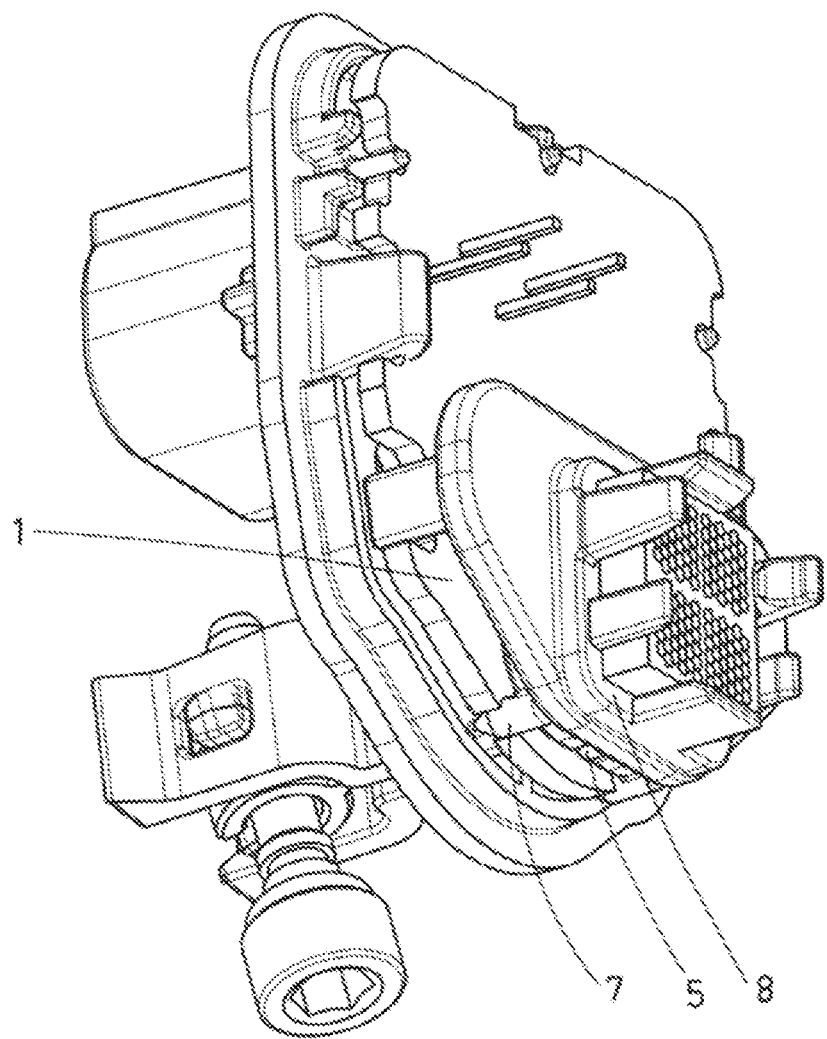
FIG. 2 shows an assembled view of some of the elements shown in FIG. 1.

FIG. 2 shows an assembled view of some of the elements shown in FIG. 1.

As may be seen in this figure, the optics support 5 is positioned with respect to the printed circuit board 1 due to the positioning protrusions 7. The optics support 5 does not need any specific attaching means, since it is trapped between the holder element 8 and the printed circuit board 5, thus achieving the coupling of these three elements as a single module.

Figure 3:
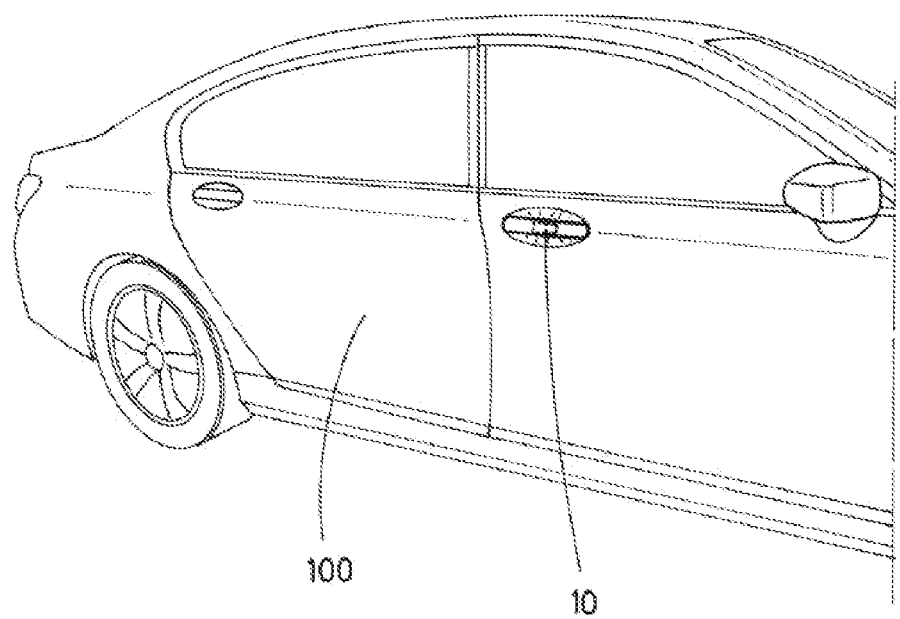
FIG. 3 shows a lighting device according to the invention mounted on an automotive vehicle.

FIG. 3 shows a lighting device 10 according to the invention mounted on an automotive vehicle 100, located in the door handle.

Elements of the example embodiments are consistently denoted by the same reference numerals throughout the drawings and detailed description where appropriate:

1 Printed circuit board
2 LEDs
3 Positioning housings
4 Lateral surface of the printed circuit board
5 Optics support
6 Collimators
7 Positioning protrusions
8 Holder support
9 Opaque walls
10 Lighting device
11 First coupler of the holder support 12 Second coupler of the holder support
13 Microlenses support
14 First group of microlenses
15 Second group of microlenses
16 Third group of microlenses
17 Fourth group of microlenses
18 Microlens
19 Housing support
20 Housing cover
21 Outer lens
100 Automotive vehicle

What is claimed is:

1. A lighting device comprising:
    a circuit support with a plurality of solid-state light sources, a plurality of positioning housings and a lateral surface;
    an optics support with a plurality of optical elements, each optical element being arranged in front of one of the solid-state light sources, the optics support further including positioning protrusions configured to fit the positioning housings of the circuit support;
    a holder support with a plurality of opaque walls, a first coupler and a second coupler, the holder support being arranged so that each opaque wall is located between two optical elements and the holder support being arranged so that at least a portion of the optics support is located between the holder support and the circuit support; and
    a microlenses support with a plurality of groups of microlenses, each group of microlenses including a plurality of microlenses arranged to receive the light projected by one optical element;
    wherein the first coupler is configured to couple the holder support to the circuit support; and
    wherein the second coupler is configured to retain the microlenses support.

2. The lighting device according to claim 1, wherein the circuit support includes at least four solid-state light sources, the optics support comprises at least four optical elements and the microlenses support comprises at least four groups of microlenses.

3. The lighting device according to claim 1, wherein the first coupler is arranged to pass around the optics support and be coupled to the lateral surface of the circuit support.

4. The lighting device according to claim 1, wherein the first coupler is arranged to be coupled to the lateral surface of the circuit support by snap-fit.

5. The lighting device according to claim 1, wherein the optical elements include collimators.

6. The lighting device according to claim 1, further comprising a housing support and a housing cover with an outer lens, so that the circuit support is attached to the housing support and the outer lens is arranged to receive the light projected by the microlenses.

* * * * *